Jan. 20, 1959  A. H. AHRENS  2,869,225
BOLT AND BEARING PULLER AND POSITIONING TOOL
Filed Oct. 27, 1954  2 Sheets-Sheet 1
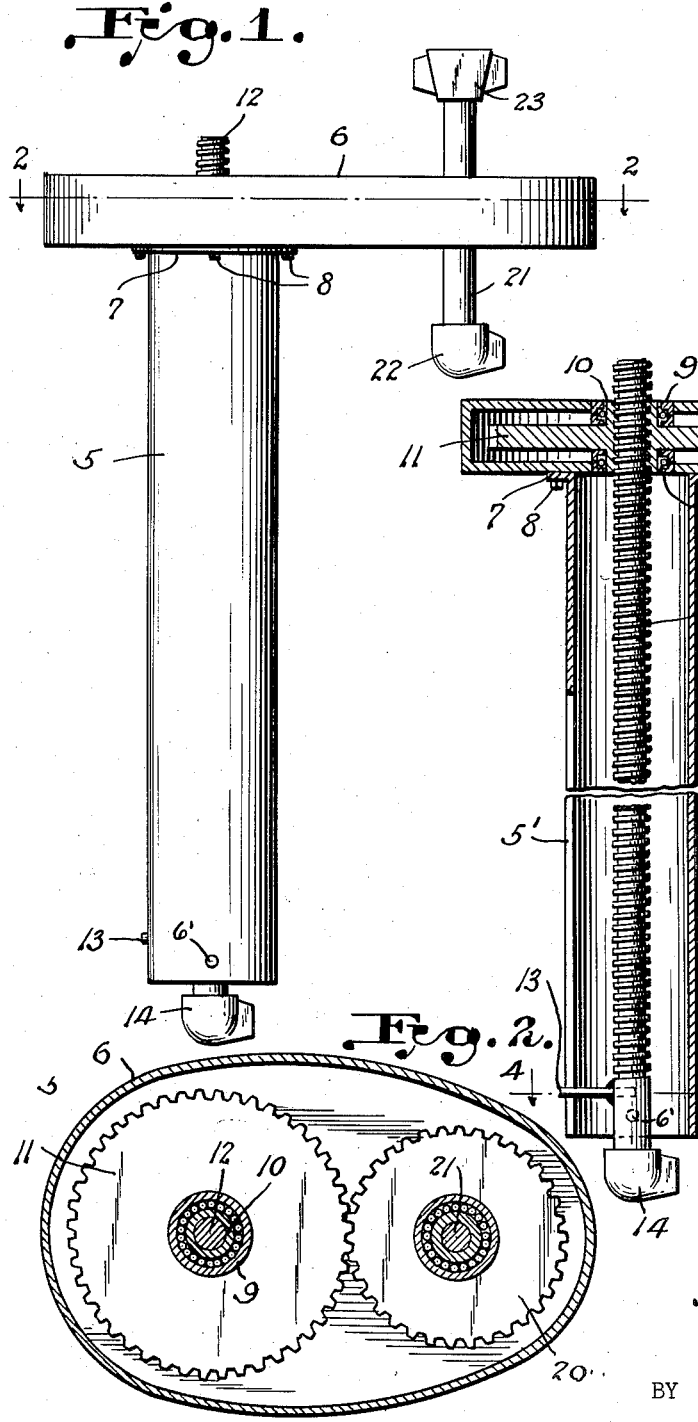
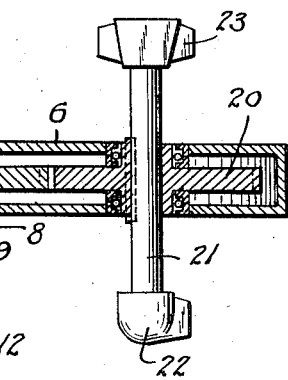
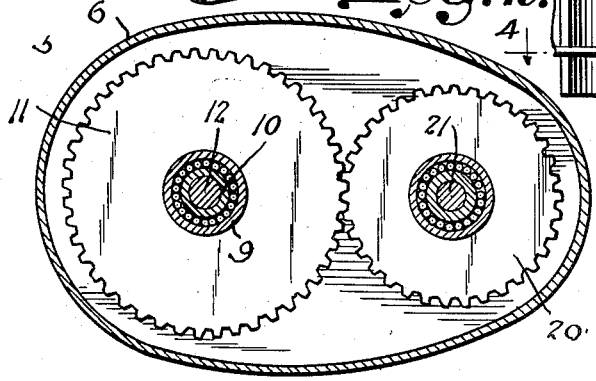
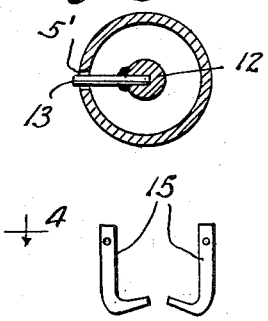
Alfred H. Ahrens
INVENTOR
BY *C. A. Snow & Co.*
ATTORNEYS.

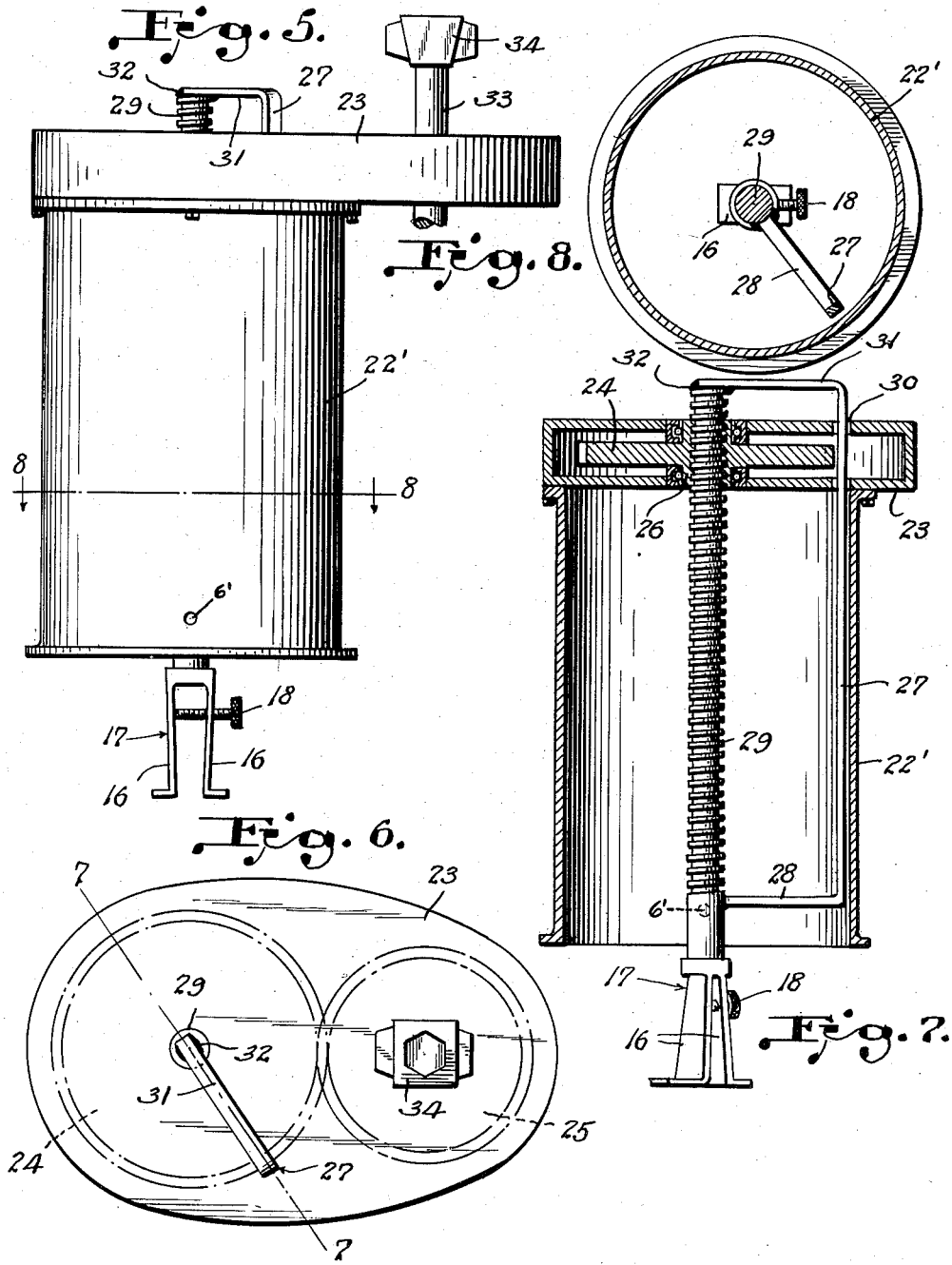

2,869,225
BOLT AND BEARING PULLER AND POSITIONING TOOL

Alfred H. Ahrens, Goodland, Kans.

Application October 27, 1954, Serial No. 465,032

1 Claim. (Cl. 29—256)

This invention relates to a tool designed for use in pulling bolts, bearings or the like, and aims to provide a tool which, when reversed in action, will also be adapted for forcing bolts or bearings in position within the openings in which the bolts or bearings are to be mounted.

Another object of the invention is to provide a tool of this type wherein the tool head may be changed to meet various requirements of use.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings,

Figure 1 is an elevational view of a tool constructed in accordance with the invention.

Figure 2 is a sectional view taken on line 2—2 of Figure 1.

Figure 3 is a vertical sectional view through the tool.

Figure 4 is a sectional view taken on line 4—4 of Figure 3.

Figure 5 is a side elevational view of a modified form of the invention.

Figure 6 is a plan view thereof.

Figure 7 is a vertical sectional view taken on line 7—7 of Figure 6.

Figure 8 is a transverse sectional view taken on line 8—8 of Figure 5.

Figure 9 is an elevational view of pivoted arms used in pulling bolts.

Referring to the drawing in detail, the tool comprises a tubular body portion indicated by the reference character 5, the body portion having a longitudinal slot 5' formed in the wall thereof extending from one end of the body portion.

The reference character 6 indicates a gear housing which is bolted to the annular flange 7 formed at the upper end of the body portion 5, as by means of the bolts 8.

The gear housing 6 is provided with an opening which is disposed directly over the upper end of the body portion 5, as better shown by Figure 3 of the drawings.

Mounted within the opening are the bearings 9 in which the laterally extended ends of the hub 10 of the large gear wheel 11 are mounted. The gear wheel 11 is formed with a threaded inner bore through which the operating screw 12 moves in operating the tool, the screw 12 being provided with laterally extended pin 13 that moves through the slot 5' of the body portion so that the operating screw will be held against rotation to position or remove a bolt or bearing under operation. Secured on one end of the operating screw 12, is a head 14 which may be positioned against a bearing or bolt to be positioned, to force the bearing or bolt within its opening.

When the tool is to be used for positioning a bolt or bearing, the pivoted arms indicated at 15 are bolted to the tubular body 5 through openings 6' formed adjacent to the free end thereof, the pivoted arms being moved inwardly to contact and grip the element in which the bolt or bearing is being positioned. It is obvious that when the operating screw is rotated to move towards the bolt or bearing, the adapter head will be forced against the bolt or bearing forcing the same into its opening.

When it is desired to pull a bearing from the inside of the bearing, a gripping head such as shown by Figure 5 of the drawings will be positioned on the operating screw 12 in lieu of the head 14, whereupon the jaws 16 of the head 17 may be separated by the screw 18 to force the jaws into close engagement with the inner end of the bearing to be pulled, securing the head 17 to the bearing.

With the end of the tubular housing 5 resting against the member from which the bolt or bearing is being removed, it is obvious that when the gear wheel 11 is rotated in the reverse direction, the operating screw 12 will be reversed to draw the screw and pulling head through the housing 5.

The reference character 20 indicates the operating gear of the tool, which is keyed to the operating shaft 21, the operating shaft 21 being provided with heads 22 and 22a which are different in construction, and designed to fit within the usual socket of an electric wrench for rotating the gears 11 and 20.

While the construction of the tool as illustrated by sheet 2 of the drawings, is somewhat different from the structure of the tool as shown by Sheet 1 of the drawings, the construction of the wrench is such that it may be used in removing bearings or bolts that are exceptionally large.

In this form of the invention, the body portion of the wrench is tubular and indicated by the reference character 22'. At one end of the tubular body is bolted a gear housing 23 in which the gears 24 and 25 are mounted, the gears 24 and 25 being in mesh so that rotation of the gear 25 will transmit rotary movement to the gear 24.

The gear 24 is provided with hub extensions 26 that operate in bearing openings formed in the gear housing 23, as shown by Figure 7 of the drawings.

In this form of the invention, a supporting rod 27 is provided and extends throughout the length of the body portion 22', the rod 27 having a lower laterally extended arm 28 on the end of which is secured a tubular bearing 23', in which the lower end of the operating screw 29 is supported. The rod 27 extends through the openings 30 of the gear housing 23, where the extremity of the rod 27 extends laterally providing an arm 31 which is welded to the end of the operating screw 29, at 32. Thus it will be seen that due to this construction, the operating screw will be free to move longitudinally of the tubular housing or body 22', but prevented from rotation.

In this form of the invention, the extracting head 17 is provided for drawing bearings from their openings.

The reference character 33 indicates a power shaft that is connected with the gear 25, the power shaft having a head 34 to be fitted in the socket of an electrically powered wrench, for rotating the shaft and gears to accomplish the purpose of the invention.

From the foregoing it is believed that the construction and operation of the tool has been clearly described, and that a further description and illustration of the tool is unnecessary.

Having thus described the invention, what is claimed is:

A tool of the class described, comprising a gear housing, a tubular open-ended body secured at one of its ends to said gear housing extending at right angles with respect thereto, gearing mounted within said gear housing, one of said gears having a threaded bore disposed axially thereof, a threaded shaft operating in said threaded bore, a supporting rod disposed within said tubular body extending substantially the length of said body, said supporting rod extending through said gear housing, the ends of said supporting rod extending laterally, the end of said rod above said housing engaging the upper end of said threaded shaft, a tubular bearing disposed on the other laterally extended end of said threaded rod in which said threaded shaft operates, a gripping head including jaws mounted on said bearing, said jaws adapted to fit within a bearing to be pulled in gripping relation therewith, means for expanding said jaws, and mechanism for effecting rotation of said gearing and hence linear movement of said threaded shaft, forcing said tubular housing against an object supporting a bearing being pulled, simultaneously drawing said gripping head and bearing toward said tubular housing, removing said bearing from the opening in which it is held.

References Cited in the file of this patent

UNITED STATES PATENTS

| | | |
|---|---|---|
| 1,253,867 | Murray | Jan. 15, 1918 |
| 1,400,897 | Moyles | Dec. 20, 1921 |
| 1,665,552 | Kell | Apr. 10, 1928 |
| 1,735,272 | Hand | Nov. 12, 1929 |
| 2,098,134 | Cook et al. | Nov. 2, 1937 |
| 2,692,521 | Pavelka | Oct. 26, 1954 |